(12) United States Patent
Whitehead et al.

(10) Patent No.: US 8,057,946 B2
(45) Date of Patent: Nov. 15, 2011

(54) INTEGRATED CHARGE AIR HEAT EXCHANGER

(75) Inventors: Lee C. Whitehead, Middleport, NY (US); Benno Andreas-Schott, Pittsford, NY (US); Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 12/054,049

(22) Filed: Mar. 24, 2008

(65) Prior Publication Data

US 2009/0239106 A1    Sep. 24, 2009

(51) Int. Cl.
*H01M 8/04* (2006.01)
*H05B 1/02* (2006.01)
*F28F 13/00* (2006.01)

(52) U.S. Cl. ........ 429/436; 429/434; 429/438; 429/439; 165/44; 219/505

(58) Field of Classification Search .................. None
See application file for complete search history.

(56) References Cited

U.S. PATENT DOCUMENTS

| | | | |
|---|---|---|---|
| 4,814,584 A * | 3/1989 | Bohlender et al. | 219/535 |
| 5,246,064 A * | 9/1993 | Hoshino et al. | 165/146 |
| 6,472,645 B1 * | 10/2002 | Bohlender | 219/505 |
| 7,168,419 B2 * | 1/2007 | Rosin et al. | 123/568.12 |
| 2007/0045263 A1 | 3/2007 | Otto et al. | |
| 2008/0142190 A1 * | 6/2008 | Chang et al. | 165/44 |

FOREIGN PATENT DOCUMENTS

| | | |
|---|---|---|
| CN | 1623033 | 6/2005 |
| CN | 1717829 | 1/2006 |
| EP | 1 621 378 A1 | 7/2004 |
| WO | WO 2006/012963 A1 | 2/2006 |

* cited by examiner

*Primary Examiner* — Cynthia Lee
(74) *Attorney, Agent, or Firm* — Fraser Clemens Martin & Miller LLC; J. Douglas Miller

(57) ABSTRACT

An integrated charge air heat exchanger for use in a vehicle fuel cell system is provided. The integrated charge air heat exchanger includes a plurality of coolant conduits adapted for a coolant fluid to flow therethrough. The integrated charge air heat exchanger further includes a plurality of heating elements and a plurality of fin elements. One heating element is disposed on a first surface of each of the coolant conduits, and one of the fin elements is disposed on a second surface of each of the coolant conduits. A method for heating the coolant fluid in a first operational mode and cooling a charge air stream in a second operational mode is also provided.

18 Claims, 5 Drawing Sheets

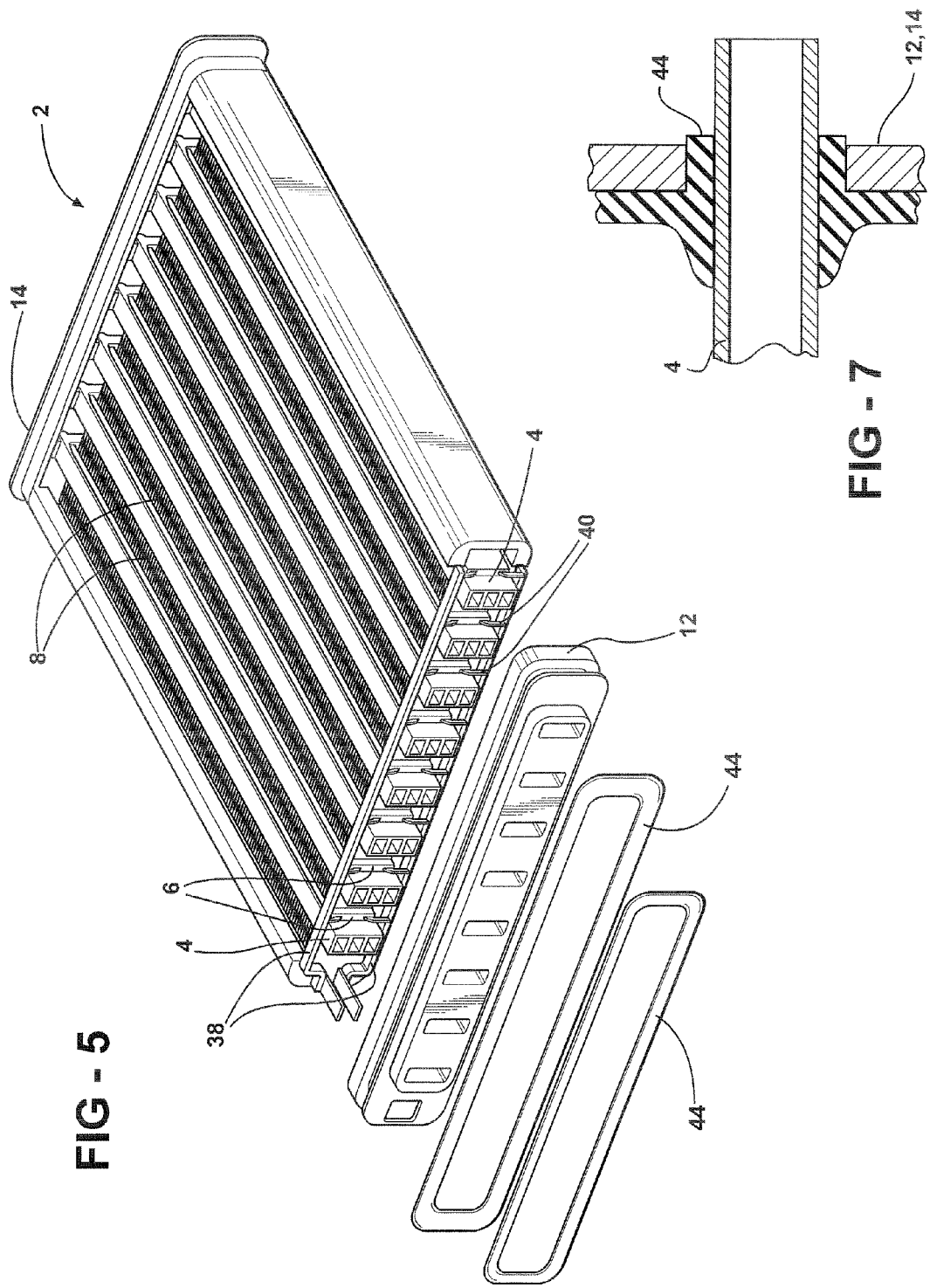

INTEGRATED CHARGE AIR HEAT EXCHANGER

FIELD OF THE INVENTION

The present disclosure relates to a heat exchanger and, more particularly, to an integrated charge air heat exchanger for a fuel cell stack.

BACKGROUND OF THE INVENTION

A fuel cell has been proposed as a clean, efficient and environmentally responsible power source for various applications. Fuel cells are electrochemical devices which combine a fuel such as hydrogen and an oxidant such as oxygen from air to produce electricity and a water byproduct. In particular, individual fuel cells can be stacked together in series to form a fuel cell stack capable of supplying a quantity of electricity sufficient to power an electric vehicle. The fuel cell stack has been identified as a potential alternative for a traditional internal-combustion engine used in modern vehicles.

One type of fuel cell is known as a proton exchange membrane (PEM) fuel cell stack. The PEM fuel cell typically includes three basic components: a cathode electrode, an anode electrode, and an electrolyte membrane. The electrolyte membrane is sandwiched between the cathode and the anode, which in turn is sandwiched between conductive, gas permeable diffusion media or diffusion layers. The diffusion media serve as current collectors for the anode and the cathode as well as provide mechanical support for the fuel cell. The diffusion media, the electrodes, and the electrolyte membrane are generally pressed between a pair of electronically conductive plates that distribute the fuel and the oxidant to the electrodes and complete the PEM fuel cell.

The fuel cell stack generally has a desired temperature range within which the fuel cell stack operation is optimized. To maintain the temperature of the fuel cell stack within the desired temperature range under normal operation, a coolant system that circulates a coolant and radiates excess heat from the fuel cell stack is typically employed. However, during a start-up operation of the fuel cell stack under cold conditions, the fuel cell stack temperature must be raised to the desired range. It is known to heat the coolant during the start-up operation with a coolant heater, for example. The coolant heater includes resistive electrical heating elements. The heated coolant is used to raise the temperature of the fuel cell stack. The resistive electrical heating elements are disengaged when the fuel cell stack generates a sufficient quantity of heat to maintain the desired temperature in conjunction with the coolant system. The temperature of the fuel cell stack is thereby regulated as desired.

Charge air coolers (CAC) for transferring heat from hot compressed air, such as the air supplied as the oxidant to the fuel cell stack, are also known. Typically, the coolant heaters and the charge air coolers operate independently of one another. Another known heat exchanger system for heating air is disclosed in EP1621378 to Brun et al., herein incorporated by reference in its entirety. EP1621378 describes a heating arrangement including self-regulating heating elements such as at least one positive temperature coefficient (PTC) element arranged between waved metal ribs for heating of air supplied to an automotive cabin.

The coolant heaters and the charge air coolers are expensive and can be volumetrically inefficient, often requiring considerable packaging space within an interior of the electric vehicle. The employment of such systems undesirably adds to complexity in designing and manufacturing the fuel cell powerplant. Conventional resistive electrical heating elements also undesirably require additional componentry in order to militate against an overheating of the coolant supplied to the fuel cell stack.

There is a continuing need for an integrated charge air heat exchanger that is volumetrically efficient, minimizes fuel cell system design and manufacturing complexity, and reduces fuel cell system cost. Desirably, the integrated charge air heat exchanger combines the coolant heater and the charge air cooler functions into a single unit, and employs self-regulating heating elements to heat a coolant in a first operating mode, and heat or cool a charge air stream in a second operating mode.

SUMMARY OF THE INVENTION

In concordance with the instant disclosure, an integrated charge air heat exchanger that is volumetrically efficient, minimizes fuel cell system design and manufacturing complexity, minimizes fuel cell system costs, combines the coolant heater and the charge air cooler functions into a single unit, and optionally employs self-regulating heating elements to heat a coolant in a first operating mode and cool a charge air stream in a second operating mode, has surprisingly been discovered.

In one embodiment, an integrated charge air heat exchanger for a fuel cell stack includes a plurality of coolant conduits adapted for a coolant fluid to flow therethrough, a plurality of heating elements, and a plurality of fin elements adapted for an air stream to flow therearound. One of the coolant conduits has a first surface and a second surface. One of the heating elements is disposed on the first surface and is adapted to transfer heat to the coolant fluid. One of the fin elements is disposed on the second surface and is adapted to transfer heat from the air stream to the coolant fluid.

In another embodiment, a fuel cell system includes a fuel cell stack, the integrated charge air heat exchanger unit in fluid communication with the fuel cell stack, and an electrical power source in electrical communication with the plurality of heating elements of the integrated charge air heat exchanger unit.

In a further embodiment, a method for regulating a temperature of a fuel cell stack first includes the step of: providing the fuel cell stack in fluid communication with the coolant conduit adapted to provide a coolant fluid to the fuel cell stack for regulating the temperature thereof. The method further includes the steps of: starting the fuel cell stack; supplying the coolant fluid to the fuel cell stack through the coolant conduit; and maintaining a coolant fluid temperature within a desired range by one of heating the coolant fluid using the heating element and heating the coolant fluid using a charge air stream flowing around the fin element.

DRAWINGS

The above, as well as other advantages of the present disclosure, will become readily apparent to those skilled in the art from the following detailed description, particularly when considered in the light of the drawings described hereafter.

FIG. 5 is an exploded, fragmentary perspective view of a coolant conduit and a heating element assembly for an integrated charge air heat exchanger according to another embodiment of the disclosure;

FIG. 7 is a fragmentary side cross-sectional view of the header shown in FIG. 6, and taken along section line 7-7;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
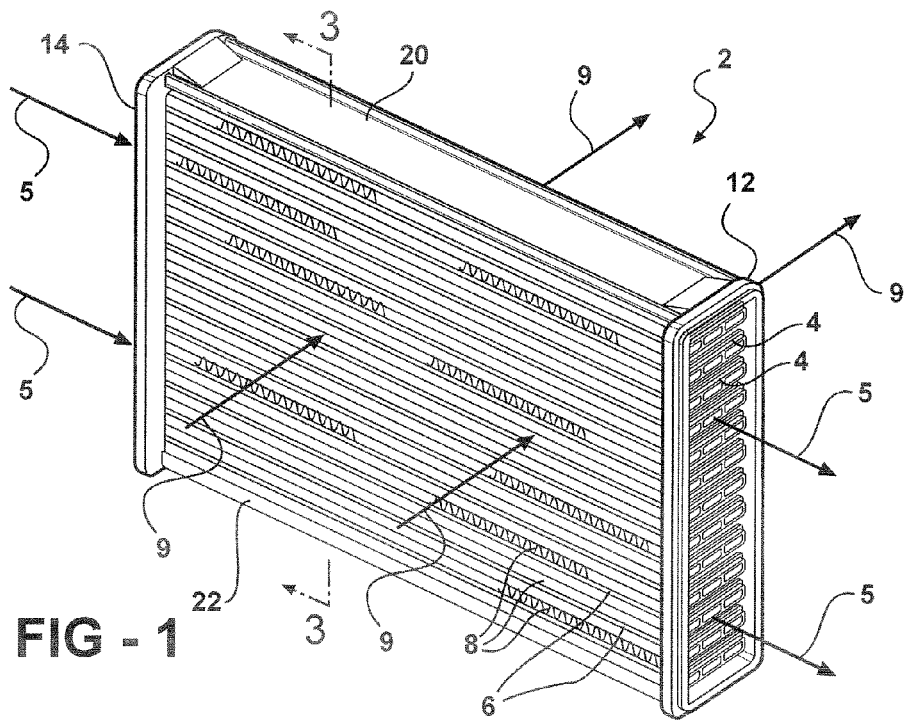
FIG. 1 is a perspective view of an integrated charge air heat exchanger according to an embodiment of the present disclosure.
Figure 2:
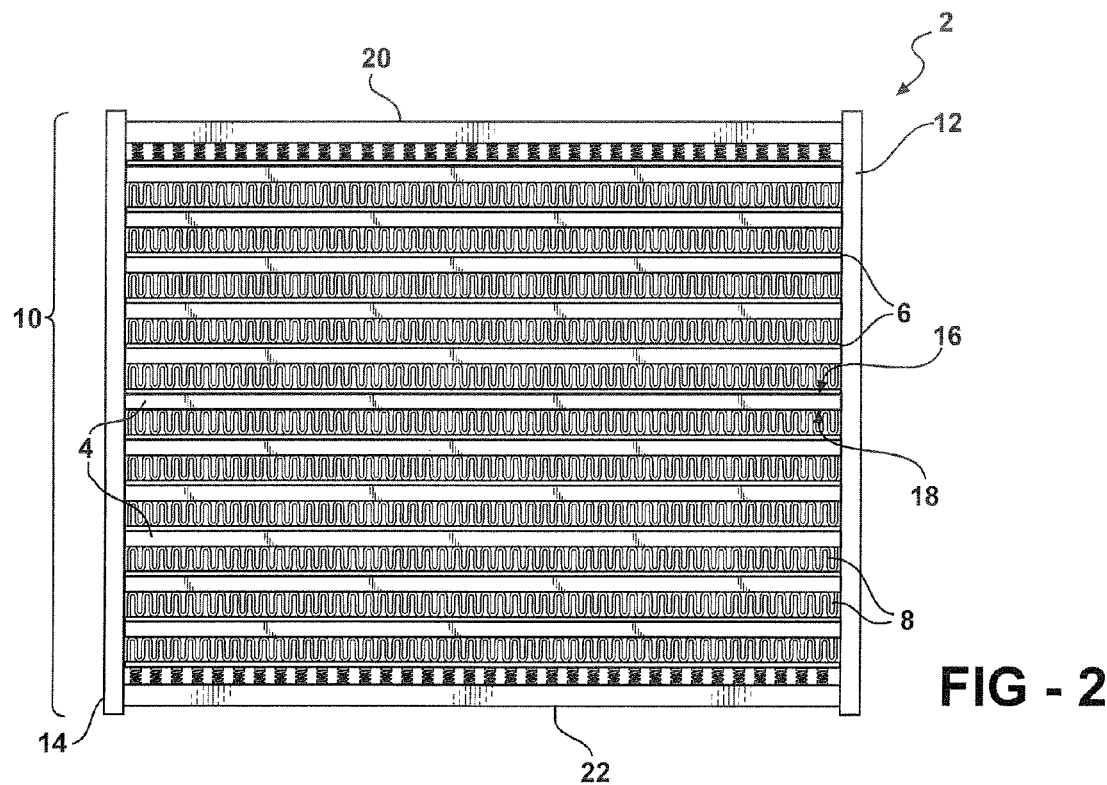
FIG. 2 is a side elevational view of the integrated charge air heat exchanger shown in FIG. 1.

An integrated charge air heat exchanger unit 2 of the present disclosure is shown in FIGS. 1 and 2. The heat exchanger unit 2 includes plurality of coolant conduits 4 adapted for a coolant fluid 5 to flow therethrough, a plurality of heating elements 6, and a plurality of fin elements 8 adapted for an air stream 9 to flow therearound. The coolant conduits 4, heating elements 6, and fin elements 8 are arranged in a stack 10 and compressed to provide contact therebetween. The heating elements 6 and the fin elements 8 are adapted to heat the coolant fluid 5 flowing through the coolant conduits 4 and supplied to a fuel cell stack (shown in FIGS. 8 and 9), for example, during a warm-up mode for the fuel cell stack under cold conditions.

The heat exchanger unit 2 further includes a first header 12 and a second header 14. The plurality of coolant conduits 4 is disposed between the first and second headers 12, 14. It should be appreciated that the first and second headers 12, 14 may be one of substantially electrically nonconductive and substantially electrically conductive, as desired. In one embodiment, the first and second headers 12, 14 are formed from a substantially nonconductive material such as a thermoplastic or elastomeric material, for example, by a molding process. It should be appreciated that other suitable materials and processes for manufacturing the headers may be employed as desired.

Figure 3:
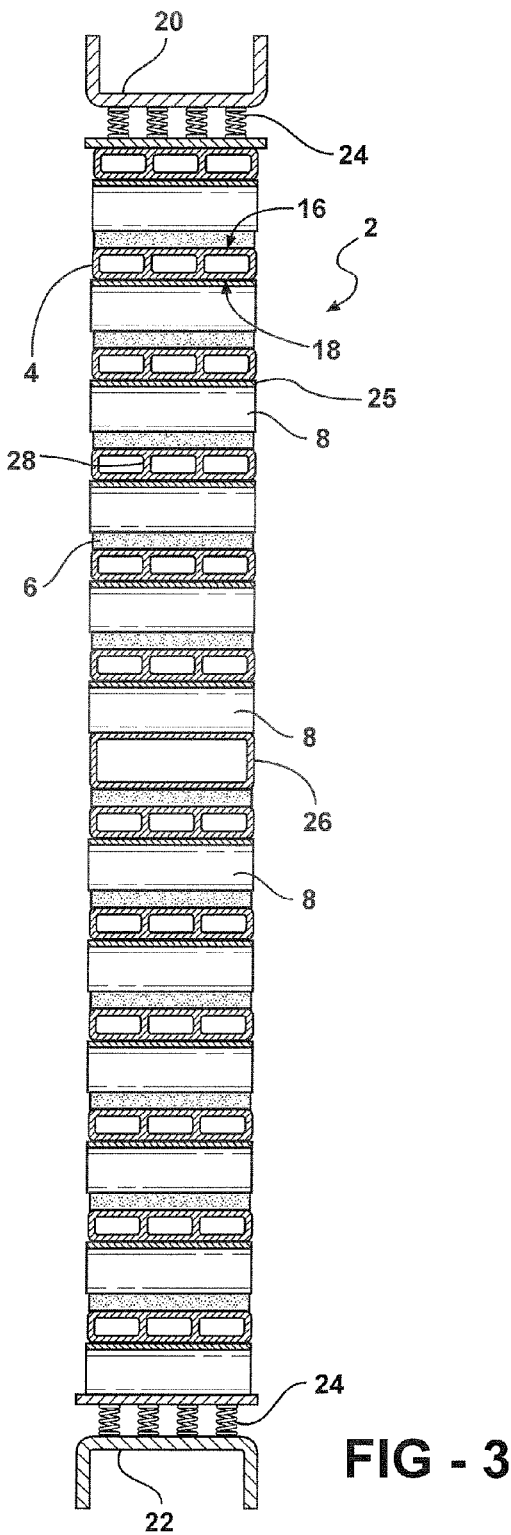
FIG. 3 is a front cross-sectional view of the integrated charge air heat exchanger shown in FIG. 1, and taken along section line 3-3.

As shown in FIGS. 1, 2, and 3, each of the coolant conduits 4 has a first surface 16 and a second surface 18. At least one of the heating elements 6 abuts the first surface 16 of each of the coolant conduits 4. The heating element 6 transfers heat generated thereby to the coolant fluid 5 flowing through the coolant conduit 4. One of the fin elements 8 is disposed on the second surface 18 of each of the coolant conduits 4. The fin element 8 transfers heat from the air stream 9 flowing therearound to the coolant fluid 5.

In a particular embodiment, at least one of the heating element 6 and the fin element 8 is bonded to the coolant conduit 4. The bonding may include a thermally conductive paste or adhesive, for example. The bonding facilitates a heat transfer between the heating elements 6 or the fin elements 8 and the coolant conduit 4 during an operation of the heat exchanger unit 2. The bonding may also facilitate electrical continuity between the heating elements 6 and the adjacent coolant conduits 4, if employed as electrical conductors. The bonding of the heating element 6 and the fin element 8 with the coolant conduit 4 may also be performed by brazing, for example. In a particularly illustrative embodiment, the coolant conduit 4 and the fin element 8 are brazed together. In another embodiment, the bonding may be performed with a thermally conductive adhesive, for example. It should be appreciated that the material employed to bond the coolant conduit 4 and the fin element 8 may be one of substantially electrically conductive and substantially electrically nonconductive. A skilled artisan should also appreciate that other suitable means for bonding the coolant conduits 4 to the heating elements 6 and the fin elements 8 may be selected as desired.

The stack 10 of the heat exchanger unit 2 may include repeating arrangements of the coolant conduits 4, the heating elements 6, and the fin elements 8. For example, one repeating arrangement includes the coolant conduit 4 sandwiched between the heating element 6 and the fin element 8. Other repeating arrangements of the coolant conduits 4, the heating elements 6, and the fin elements 8 may be selected as desired. It should be appreciated that a thermally insulating material may be disposed between the heating elements 6 and the fin elements 8 when the repeating arrangement results in the heating element 6 being disposed immediately adjacent the fin element 8.

The heat exchanger unit 2 may include a first side channel 20 and a second side channel 22. The first and second side channels 20, 22 are mounted between the first header 12 and the second header 14. As shown in FIG. 3, the heat exchanger 2 may also include a plurality of compression springs 24 adapted to maintain a positive contact between the plurality of fin elements 8, the plurality of coolant conduits 4, and the plurality of heating elements 6. In one example, the compressions springs 24 are disposed between one of the coolant channels 4 and one of the first and second side channels 20, 22. In another embodiment, the compression springs 24 may be disposed between one of the heating elements 6 and one of the first and second side channels 20, 22, for example. As a further example, the compression springs 24 may be disposed between one of the fin elements 8 and one of the first and the second side channels 20, 22. It should be understood that the plurality of compression springs 24 facilitate the transfer of heat to the coolant fluid 5 from at least one of the heating elements 6 and the air stream 9 flowing through the fin elements 8 by providing a sufficient contact between the coolant conduits 4, the heating elements 6, and the fin elements 8.

The compression springs 24 may also facilitate an electrical path between at least a portion of the coolant conduits 4 and the heating elements 6 that enables an operation of the heating elements 6. As a nonlimiting example, the heat exchanger unit 2 may include a plurality of dielectric layers 25. One of the dielectric layers 25 may be disposed between one of the coolant conduits 4 and one of the fin elements 8 in the heat exchanger unit 2, for example. The dielectric layers 25 militate against an electrical short circuit of the heat exchanger unit 2 when the coolant conduits 4 are employed to provide electrical power to the heating elements 6. The dielectric layers 25 may also be employed to bond the coolant conduits 4 to the fin elements 8. Suitable dielectric materials may be selected as desired.

It should be appreciated that the heat exchanger unit 2 is adapted to accept substantially all of the coolant fluid 5 that is directed to the fuel cell stack, for example, more coolant fluid 5 than may be desired for cooling the air stream 9 alone. For example, the heat exchanger unit 2 may include at least one bypass conduit 26 adapted to direct an additional quantity of the coolant fluid 5 through the heat exchanger unit 2. The at least one bypass conduit 26 may be substantially insulated from the plurality of heating elements 6 and the plurality of fin elements 8. The additional quantity of the coolant fluid 5 bypassing the heat exchanger unit 2 may thereby be substantially unheated in comparison to the coolant fluid 5 flowing through the plurality of coolant conduits 4.

The coolant conduits 4 of the heat exchanger unit 2 may have a cross-sectional shape adapted to maximize a contact area with the heating elements 6. For example, the coolant conduits 4 may have a substantially rectangular cross-sectional shape. The coolant conduits 4 are also formed from a material such as one of steel and aluminum, for example, which has a heat transfer coefficient that facilitates a heat transfer with the coolant fluid 5 flowing therein. In an illustrative embodiment, at least one of the coolant conduits 4 is a substantially flat, extruded aluminum tube. Other suitable cross-sectional shapes and materials for the coolant conduits 4 may be employed as desired.

In a further embodiment, the coolant conduits 4 may have at least one support feature 28 disposed therein that militates against an undesirable deflection of the coolant conduits 4 when the stack 10 is placed under compression. The support feature 28 may include a plurality of webs or walls formed inside of the coolant conduits 4. It should be appreciated that the webs of the coolant conduits 4 may form subchannels within the conduits 4 through which the coolant fluid 5 may flow. The support feature 28 may include a plurality of nodules formed on an interior surface of the coolant conduits 4. A skilled artisan should appreciate that other suitable support features for militating against a collapse of the coolant conduits 4 under compression may be employed.

Figure 4A:
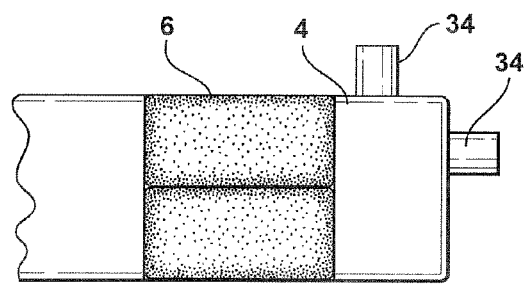
FIG. 4A is a top plan view of a coolant conduit and a heating element assembly for an integrated charge air heat exchanger showing an arrangement of the heating elements on a coolant conduit.
Figure 4B:
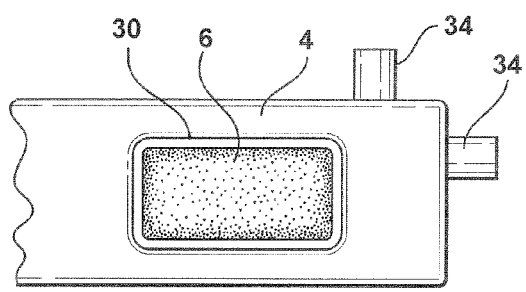
FIG. 4B is a top plan view of a coolant conduit and the heating element assembly for an integrated charge air heat exchanger showing the heating element in a cavity formed in a coolant conduit.
Figure 4C:
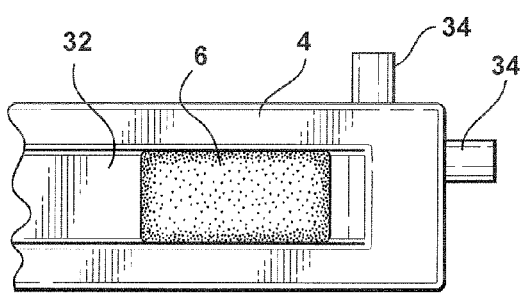
FIG. 4C is a top plan view of a coolant conduit and the heating element assembly for an integrated charge air heat exchanger showing the heating element in a channel formed in a coolant conduit.

Referring now to FIGS. 4A to 4C, the heating elements 6 are disposed on the coolant conduits 4. In certain embodiments having the coolant conduits 4 provide electrical power to the heating elements 6, the heating elements 6 may be disposed in electrical communication with the coolant conduits 4. In other embodiments with the heating elements 6 provided electrical power independently of the coolant conduits 4, such as with a bus bar (shown in FIG. 5), for example, a dielectric material may be disposed between the heating elements 6 and the coolant conduits 4. The heating elements 6 may have dimensions that substantially conform to and cover the coolant conduits 4. In one embodiment, the heating elements 6 may have dimensions that allow more than one heating element 6 to be disposed on one of the first side 16 of the coolant conduit 4. The heating elements 6 may be arranged on the coolant conduit 4 and substantially cover the coolant conduit 4. In another example, the heating elements 6 may be arranged on the coolant conduit 4 in a substantially spaced apart arrangement. It should be appreciated that the heating elements 6 may not be evenly distributed the coolant conduit 4. The heating elements 6 may further be unevenly distributed between individual coolant conduits 4 within the plurality of coolant conduits 4.

In certain embodiments, the first surface 16 of the coolant conduit 4 may include a cavity 30 formed therein adapted to retain at least one of the heating elements 6. It should be appreciated that the cavity 30, if formed substantially along a length for the coolant conduit 4, may form a channel 32 within which more than one of the individual heating elements 6 may be disposed.

A skilled artisan should understand that the heating elements 6 of the present disclosure are desirably self-regulating, although conventional resistive heating elements 6 with suitable temperature regulation controls may also be employed. As a nonlimiting example, the heating elements 6 may be formed from positive temperature coefficient (PTC) materials that are heated by passing an electric current therethrough, and that experience an increase in electrical resistance as the temperature of the heating elements 6 increases. In particular, the PTC-based heating elements 6 act as their own thermostats, effectively reaching an electrical resistance high enough to "switch off" when a predetermined maximum temperature is reached. As a nonlimiting example, the PTC-based heating elements 6 of the present disclosure may be selected to heat to a predetermined temperature range between about 20° C. and about 260° C., in particular between about 30° C. and about 180° C., and in more particular between about 40° C. and about 150° C. In further nonlimiting examples, the PTC-based heating elements 6 may be adapted to reach the predetermined maximum temperature and switch off at about 150° C., in another example at about 80° C., and in another example at about 60° C. A skilled artisan should understand that PTC-based heating elements 6 having different temperature capabilities may also be employed, and that the selection of the appropriate PTC-based heating elements 6 may depend, at least in part, on a desired operating temperature of the fuel cell stack.

As a nonlimiting example, an electric current may be provided to the heating elements 6 by placing the coolant conduits 4 in electrical communication with an electrical power source (not shown), such as a high voltage power source, for example. The coolant conduits 4 may include at least one electrically conductive tab 34 disposed thereon. The electrically conductive tab 34 may facilitate the electrical communication between the electrical power source and the heating elements 6 of the heat exchanger unit 2. The electrically conductive tab 34 may be disposed on the coolant conduit 4 in line with the flow of the coolant fluid 5, for example. In another example, the electrically conductive tab 34 may be disposed on the coolant conduit 4 in line with the flow of the air stream 9. At least one of discrete wires and foils may be employed to facilitate the electrical communication between the heating elements 6 and the electrical power source. In another embodiment, the heating elements 6 are placed in a substantially isolated electrical communication with the electrical power source via electrical communication with a bus bar 38 with a plurality of fingers 40 (for example, as shown in FIG. 5). It should be appreciated that other suitable means for providing the electric current to the plurality of heating elements 6 may be employed as desired.

In an alternative embodiment shown in FIG. 5, the heating elements 6 of the heat exchanger unit 2 may be independently powered. For example, the heating elements 6 may be in electrical communication with a bus bar 38. The bus bar 38 is adapted to provide the electrical communication between the heating elements 6 and the electrical power source. The bus bar 38 may have a plurality of electrically conductive fingers 40 coupled with the heating elements 6. In one particular example, a dielectric material (not shown) is disposed between the coolant conduits 4 and the heating elements 6. It should be appreciated that the dielectric material does not substantially inhibit a heat transfer between the heating elements 6 and the coolant conduits 4. The dielectric material militates against an electrical communication between the plurality of coolant conduits 4 and the heating elements 6 when the heating elements 6 are adapted to be independently powered. The bus bar 38 may also have the dielectric material disposed thereover to militate against electrical communication with components of the heat exchanger unit 2 other than the heating elements 6, for example.

At least one of the cavity 30 and the channel 32 of the heat exchanger unit 2 may further include at least one retainer (not shown) disposed therein for holding the at least one of the heating elements 6. The retainer may have a locking ridge or tab, for example, for securely inserting the heating elements 6 therein. The retainer may be formed from a plastic, for example, by one of a molding and an extruding process. Other suitable means for holding the heating elements 6 in place may also be employed.

Figure 6:
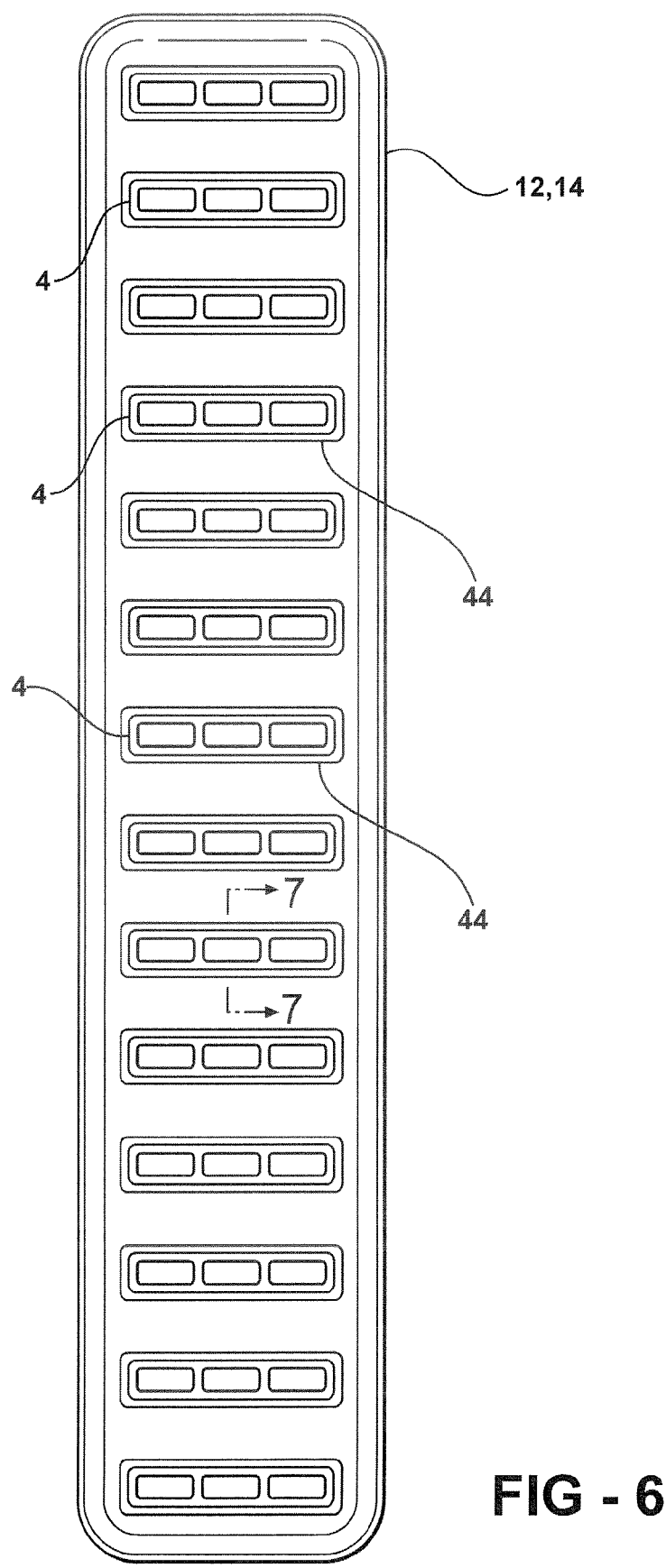
FIG. 6 is a front elevational view of a header for an integrated charge air heat exchanger according to another embodiment of the disclosure.

With reference to FIGS. 5, 6, and 7, one of the first and second headers 12, 14 is shown in greater detail. The first and second headers 12, 14 are adapted to electrically isolate each of the plurality of coolant conduits 4 from one another. For example, the heat exchanger unit 2 may include at least one seal 44 disposed on at least one of the first and the second headers 12, 14. The seal 44 may be disposed on either side of the first and second headers 12, 14 as desired. For example, the seal 44 may be disposed on an interior side of the headers 12, 14 with the plurality of coolant conduits 4 and an exterior side of the first and second headers 12, 14 with other componentry within the fuel cell system, such as a coolant side tank (not shown). The seal 44 provides a substantially fluid tight seal between the coolant conduits 4 and the first and second headers 12, 14. The coolant conduits 4 may be sealed to the first and second headers 12, 14 with an elastomeric material, for example, applied therebetween. In a particular embodiment, the seal 44 is a header gasket that may be pre-molded to fit with the first and second headers 12, 14. The header gasket may include a peripheral lip that facilitates the substantially fluid tight seal. The at least one seal 44 may include an O-ring, for example. In a further embodiment, the at least one seal 44 may be formed by disposing an epoxy-based sealant in between the first and second headers 12, 14 and the coolant conduits 4 to form a substantially fluid tight seal upon a curing of the sealant. Other suitable means for forming the seal 44 may be employed as desired.

Figure 8:
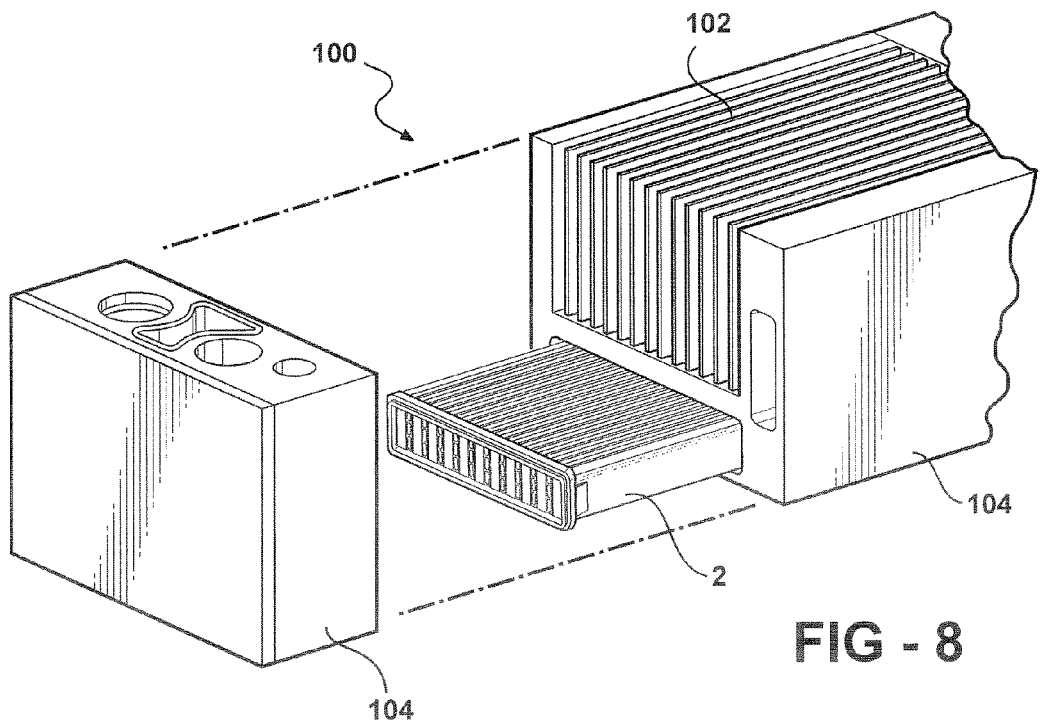
FIG. 8 is a partially exploded fragmentary perspective view of a fuel cell system having the integrated charge air heat exchanger shown in FIG. 1.
Figure 9:
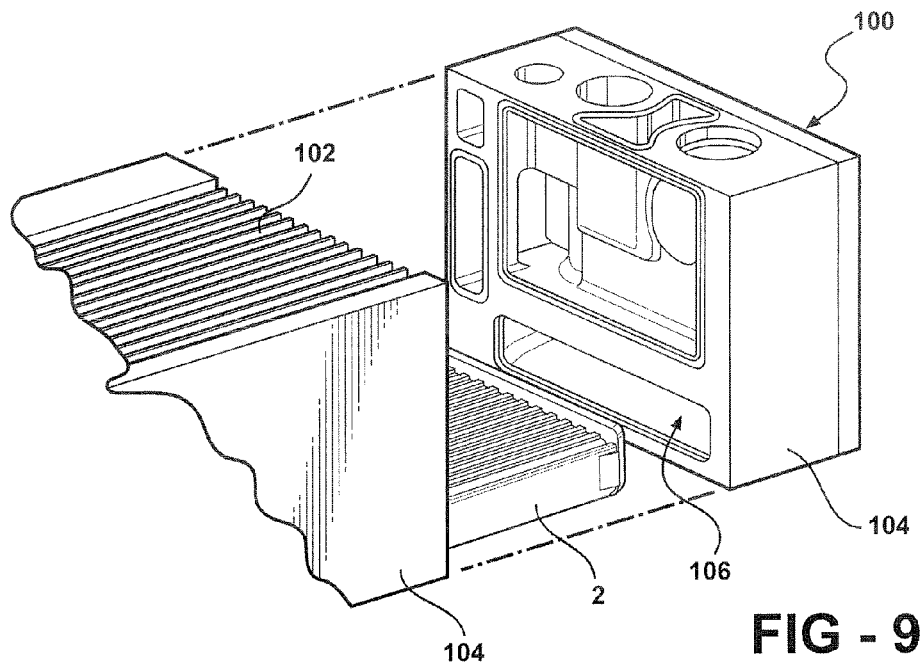
FIG. 9 is a partially exploded fragmentary perspective view of the fuel cell system shown in FIG. 8.

Referring now to FIGS. 8 and 9, the present disclosure includes a fuel cell system 100 with the integrated charge air heat exchanger unit 2. The fuel cell system 100 includes a humidification unit 102 and a fuel cell stack (not shown) in fluid communication with the heat exchanger unit 2, and the electrical power source (not shown). The humidification unit 102 may be adapted to humidify the air stream 9 flowing from the integrated charge air heat exchanger unit 2. As a nonlimiting example, the electrical power source may include a high voltage battery. The fuel cell stack may be selectively employed as the electrical power source, for example, during the operation of the fuel cell system 100. It should be appreciated that any other suitable sources of electrical power for operation of the heat exchanger unit 2 may be used.

The fuel cell system 100 may further include a coolant fluid pump (not shown) and an air compressor (not shown). The coolant fluid pump is in fluid communication with the plurality of coolant conduits 4 and is adapted to provide the coolant fluid 5 to the integrated charge air heat exchanger 2 and the fuel cell stack. The air compressor is in fluid communication with the plurality of fin elements 8 and adapted to provide the air stream 9 thereto.

In one particular embodiment, the fuel cell system 100 includes an end unit housing 104, such as the housing of a lower end unit (LEU) or an upper end unit (UEU), with the fuel cell stack disposed between the LEU and the UEU. Each of the humidification unit 102 and the heat exchanger unit 2 may be at least partially disposed in the end unit housing 104. For example, the end unit housing 104 has at least one coolant cavity 106 formed therein. The coolant cavity 106 is in fluid communication with plurality of coolant conduits 4 of the heat exchanger unit 2. The coolant cavity 106 is adapted to one of: 1) deliver the coolant fluid 5 to the coolant conduits 4; and 2) deliver the coolant fluid 5 from the coolant conduits 4 to the fuel cell stack. In other embodiments, the coolant cavity 106 may be a coolant tank for holding a quantity of the coolant fluid 5 for circulation through the heat exchanger unit 2 and subsequently the fuel cell stack.

The present disclosure includes a method for regulating a temperature of the fuel cell stack. The method first includes the step of providing the fuel cell stack 2 in fluid communication with at least one of the coolant conduit 4 of the heat exchanger unit 2, the coolant conduit 4 disposed between the heating element 6 and the fin element 8 as described hereinabove. The coolant conduit 4 is adapted to provide the coolant fluid 5 to the fuel cell stack for regulating the temperature thereof. The fuel cell stack is then started and the coolant fluid 5 supplied to the fuel cell stack through the coolant conduit 4. In a first operational mode, the method further includes the step of maintaining the temperature of the coolant fluid 5 within a desired range by one of heating the coolant fluid 5 using the heating element 6 and heating the coolant fluid 5 using the charge air stream 9 flowing around the fin element 8.

The method further includes the step of supplying the electrical power to the heating element 6 disposed on the coolant conduit 4, thereby electrically heating the coolant fluid 5 flowing therethrough. It should be appreciated that the use of the heating elements 6 of the heat exchanger unit 2 to heat the coolant fluid 5 may be particularly useful during a warm-up of the fuel cell stack, such as during a start-up operation of the fuel cell stack under cold ambient conditions.

A skilled artisan should understand that the charge air stream 9 from the air compressor typically has a temperature higher than a temperature of ambient air which is compressed to provide the charge air stream 9. Thus, in a further embodiment, the method of the first operational modes includes a transfer of heat from the warm, charge air stream 9 to the coolant fluid 5.

The heat exchanger unit 2 may be further employed in a second operational mode. For example, the method of the disclosure may include the step of cooling the charge air stream 9 by transferring heat therefrom to the coolant fluid 5. The cooled charge air stream 9 may then be directed to the humidification unit 102 for humidification, and to the fuel cell stack for use as the oxidant in the electrochemical fuel cell reaction. An undesirable dehumidification and degradation of the membranes of the fuel cell stack may thereby be militated against.

It is surprisingly found that the use of both the PTC-based heating elements 6 and the fin elements 8 in a single heat exchanger reduces packaging space over conventional-type heaters with resistive heating elements. The employment of the PTC-based heating elements 6, in particular, enables the heat exchanger unit 2 to be self-regulating. Thus, the use of conventional regulating mechanisms and equipment is militated against. An overheating due to a failure of the conventional regulating mechanisms and resistive heating elements is also militated against. It is also desirably found that the integrated charge air heat exchanger 2 of the disclosure combines both the coolant heater and CAC functions into a single unit.

While certain representative embodiments and details have been shown for purposes of illustrating the invention, it will be apparent to those skilled in the art that various changes may be made without departing from the scope of the disclosure, which is further described in the following appended claims.

What is claimed is:

1. An integrated charge air heat exchanger for a fuel cell stack, comprising:
   a plurality of coolant conduits adapted for a coolant fluid to flow therethrough, each of the coolant conduits having a first surface and a second surface;
   a plurality of heating elements, one of the heating elements disposed on the first surface of each of the coolant conduits and adapted to transfer heat to the coolant fluid;
   a plurality of fin elements adapted for an air stream to flow therearound, one of the fin elements disposed on the second surface of each of the cooling conduits and adapted to facilitate heat transfer between the air stream and the coolant fluid; and
   a busbar having a plurality of fingers adapted to provide an isolated electrical communication between an electrical power source and the heating elements, each of the fingers abutting and in electrical communication with one of the heating elements, the busbar disposed adjacent each of the plurality of coolant conduits; and
   an insulating material disposed on the busbar to electrically insulate the busbar from the plurality of coolant conduits.

2. The integrated charge air heat exchanger of claim 1, wherein the heating element is a self-regulating, positive temperature coefficient (PTC) element.

3. The integrated charge air heat exchanger of claim 1, further comprising:
   a first header and a second header having the plurality of coolant conduits disposed therebetween, the first and second headers in fluid communication with the plurality of coolant conduits and electrically isolating each of the plurality of coolant conduits from one another.

4. The integrated charge air heat exchanger of claim 3, further comprising:
   a seal disposed on at least one of the first and the second headers and providing a substantially fluid tight seal between the coolant conduits and the at least one header.

5. The integrated charge air heat exchanger unit according to claim 4, wherein the seal is a header gasket.

6. The integrated charge air heat exchanger unit according to claim 3, further comprising:
   a first side channel and a second side channel mounted between the first header and the second header; and
   a plurality of compression springs disposed between one of the fin elements and one of the first and the second side channels, the plurality of compression springs providing a positive contact between the plurality of fin elements, the plurality of coolant conduits, and the plurality of heating elements to facilitate the heat transfer to the coolant fluid.

7. The integrated charge air heat exchanger unit according to claim 1, wherein the fin element is bonded to the coolant conduit.

8. The integrated charge air heat exchanger unit according to claim 1, further including at least one bypass conduit substantially thermally insulated from the plurality of heating elements and the plurality of fin elements.

9. The integrated charge air heat exchanger unit according to claim 1, wherein the first surface of the coolant conduit has a channel formed therein adapted to retain the heating elements.

10. The integrated charge air heat exchanger unit according to claim 9, further comprising a retainer disposed in the channel of the coolant conduit and having a locking tab formed thereon adapted to retain the heating elements.

11. A fuel cell system comprising:
    a fuel cell stack;
    an integrated charge air heat exchanger unit in fluid communication with the fuel cell stack, the unit including:
       a plurality of coolant conduit adapted for a coolant fluid to flow therethrough, one of the coolant conduit having a first surface and a second surface,
       a plurality of heating elements, one of the heating elements disposed on the first surface of each of the coolant conduits and adapted to transfer heat to the coolant fluid,
       a plurality of fin elements adapted for an air stream to flow therearound, one of the fin elements disposed on the second surface of each of the coolant conduits and adapted to transfer heat from the air stream to the coolant fluid,
       a busbar having a plurality of fingers, each of the fingers abutting and in electrical communication with one of the heating elements, the busbar disposed adjacent each of the plurality of coolant conduits, and
       an insulating material disposed on the busbar to electrically insulate the busbar from the plurality of coolant conduits; and
    an electrical power source in electrical communication with the plurality of heating elements via the plurality of fingers of the busbar.

12. The fuel cell system according to claim 11, further comprising:
    a coolant fluid pump in fluid communication with the plurality of coolant conduits and adapted to provide the coolant fluid to the integrated charge air heat exchanger and the fuel cell stack.

13. The fuel cell system according to claim 11, wherein the plurality of heating elements are adapted to operate within a predetermined temperature range and to switch off when a predetermined maximum temperature is reached.

14. The fuel cell system according to claim 11, wherein the plurality of fin elements are in fluid communication with an air compressor adapted to provide the air stream thereto.

15. The fuel cell system according to claim 11, further comprising:
    an end unit housing having a humidification unit and the integrated charge air heat exchanger unit disposed therein, the end unit housing having at least one coolant cavity formed therein in communication with plurality of coolant conduits and adapted to one of deliver the coolant fluid to the coolant conduits and deliver the coolant fluid from the coolant conduits to the fuel cell stack.

16. A method for regulating a temperature of a fuel cell stack, comprising the steps of:
    providing an integrated charge air heat exchanger unit in fluid communication with the fuel cell stack, the unit including a plurality of coolant conduit adapted for a coolant fluid to flow therethrough, one of the coolant conduit having a first surface and a second surface, a plurality of heating elements, one of the heating elements disposed on the first surface of each of the coolant conduits and adapted to transfer heat to the coolant fluid, a plurality of fin elements adapted for an air stream to flow therearound, one of the fin elements disposed on the second surface of each of the coolant conduits and adapted to transfer heat from the air stream to the coolant fluid, a busbar having a plurality of fingers, each of the fingers abutting and in electrical communication with one of the heating elements, the busbar disposed adjacent each of the plurality of coolant conduits, and an insulating material disposed on the busbar to electrically insulate the busbar from the plurality of coolant conduits, and an electrical power source in electrical communication with the plurality of heating elements via the plurality of fingers of the busbar;

starting the fuel cell stack;

supplying the coolant fluid to the fuel cell stack through the coolant conduit; and maintaining a coolant fluid temperature within a desired range by one of heating the coolant fluid using the heating element and heating the coolant fluid using a charge air stream flowing around the fin element.

17. A method for regulating a temperature of a fuel cell stack according to claim 16, further comprising the step of:

supplying an electrical power to the heating element disposed on a coolant conduit of the integrated charge air heat exchanger unit, thereby electrically heating the coolant fluid flowing therethrough.

18. A method for regulating a temperature of a fuel cell stack according to claim 16, further comprising the steps of:

cooling the charge air stream by transfer heat therefrom to the coolant fluid; and directing the cooled charge air stream to the fuel cell stack for an electrochemical fuel cell reaction.

\* \* \* \* \*